United States Patent [19]

Wainfan et al.

[11] Patent Number: 5,366,180

[45] Date of Patent: Nov. 22, 1994

[54] HIGH-LIFT DEVICE FOR AIRCRAFT

[75] Inventors: Barnaby S. Wainfan, Long Beach; Matthew N. Mrdeza, Norwalk, both of Calif.

[73] Assignee: Northrop Corporation, Los Angeles, Calif.

[21] Appl. No.: 85,441

[22] Filed: Jun. 30, 1993

[51] Int. Cl.$^5$ .............................................. B64C 5/04
[52] U.S. Cl. ................................... 244/45 A; 244/46
[58] Field of Search ................. 244/90 R, 45 R, 45 A, 244/199, 46; D12/331, 332

[56] References Cited

U.S. PATENT DOCUMENTS

| | | | |
|---|---|---|---|
| D. 291,554 | 8/1987 | Enav | D12/332 |
| 1,825,578 | 9/1931 | Cernuda | D12/331 |
| 2,924,400 | 2/1960 | Ruget | 244/45 A |
| 2,997,260 | 8/1961 | Locke, Jr. | 244/45 |
| 3,270,989 | 4/1966 | Polhamus | 244/46 |
| 3,385,538 | 5/1968 | Hodges | 244/13 |
| 3,642,234 | 2/1972 | Kamber et al. | 244/45 |
| 3,848,831 | 11/1974 | Geary | 244/45 R |
| 3,883,094 | 5/1975 | Mederer | 244/45 A |
| 3,926,389 | 12/1975 | Mederer | 244/45 A |
| 4,378,922 | 4/1983 | Pierce | 244/199 |
| 4,542,866 | 9/1985 | Caldwell et al. | 244/45 A |
| 4,691,879 | 9/1987 | Greene | 244/45 |
| 4,767,083 | 8/1988 | Koenig et al. | 244/12.3 |
| 4,828,203 | 5/1989 | Clifton et al. | 244/12.3 |
| 4,917,333 | 4/1990 | Murri | 244/75 |

FOREIGN PATENT DOCUMENTS

| | | | |
|---|---|---|---|
| 1522282 | 2/1967 | France | 244/45 A |
| 2656692 | 6/1978 | Germany | 244/45 A |
| 2730032 | 1/1979 | Germany | 244/45 R |

OTHER PUBLICATIONS

*Flight International*, p. 1730, Dec. 31, 1983.

Primary Examiner—Galen L. Barefoot
Attorney, Agent, or Firm—Terry J. Anderson; Karl J. Hoch, Jr.

[57] ABSTRACT

High lift producing apparatus for an aircraft includes a pair of foreplanes, one for each side of the aircraft, each foreplane extending between a root end at the fuselage and a distant tip end. Wings are mounted on the fuselage aft of the foreplanes and, intermediate the wings and the foreplanes, are a pair of strakes which are generally coplanar with their associated foreplanes and strakes, a leading edge of each strake being substantially coincident with a trailing edge of its associated foreplane, and a trailing edge of each strake being substantially coincident with a leading edge of its associated wing. The span of the strakes is smaller than the span of the foreplanes at the location of intersection of said strake and said foreplane. Each foreplane may be pivotally mounted on the fuselage at its root end on a stationary hinge axis which is substantially parallel with the longitudinal axis of the aircraft. The foreplanes are thereby movable between inactive positions flush with a contoured outer surface of the fuselage and deployed positions at which tip ends are distant from the fuselage. The foreplanes may also be pivotally mounted on lateral axes for control purposes. In one instance, the foreplanes can be simultaneously moved in the same direction about their associated lateral axes to achieve pitch control of the aircraft; in other instances, they can be independently moved about their associated lateral axes to achieve either yaw control or roll control.

23 Claims, 2 Drawing Sheets

○ — RUN 259
□ — RUN 253 100 %
△ — RUN 253 120 %

HIGH-LIFT DEVICE FOR AIRCRAFT

FIELD OF THE INVENTION

The present invention relates to apparatus for producing high lift during the operation of a high performance aircraft. More specifically, the invention relates to the provision in an aircraft of the combination of a canard or foreplane with a strake wherein the strake is substantially coplanar with the foreplane and with the wing of the aircraft. A leading edge of the strake is substantially coincident with a trailing edge of the foreplane and a trailing edge of the strake is substantially coincident with the leading edge of the wing of the aircraft.

DISCUSSION OF THE PRIOR ART

It is a continuing challenge for aircraft designers to improve the aerodynamic control and maneuvering capability of aircraft. Improving control and maneuvering is especially important for supersonic fighter aircraft. This is because they have special requirements related to their ability to "track" or "aim" the fuselage in a particular desired direction. Associated with this is a further requirement to change "tracking" or "aiming" direction quickly which is commonly called maneuverability.

Maneuvering flight means flight at high angles of attack. In that flight regime aircraft experience a severe degradation of aerodynamic control, and the large empennages typically associated with fighter aircraft are the usual design solutions to cope with these deficiencies. It is desirable to reduce the size of the empennage or to eliminate it entirely to achieve benefits in terms of weight, drag and signature. Therefore, it is an objective of this invention to allow an empennage size reduction by providing foreplanes and associated strakes on the forward fuselage which substitute the controllability lost by downsizing the empennage and provide nearly constant controllability throughout the angle of attack range. The foreplane component of the invention may be fixed or it may be designed to operate only intermittently in response to a required control command and lie retracted into the fuselage contour in times of disuse in order to reduce drag.

The following U.S. patents disclose various known aircraft configurations which include either a single foreplane without a strake or a single strake without a foreplane:

| U.S. PAT. NO. | INVENTOR(S) | ISSUE DATE |
|---|---|---|
| 4,917,333 | Murri | 4/17/90 |
| 4,828,203 | Clifton et al. | 5/09/89 |
| 4,767,083 | Koenig et al. | 8/30/88 |
| 3,926,389 | Mederer | 12/16/75 |
| 3,883,094 | Mederer | 5/13/75 |
| 3,848,831 | Geary | 11/19/74 |
| 3,642,234 | Kamber et al. | 2/15/72 |
| 3,385,538 | Hodges | 5/28/68 |
| 2,997,260 | Locke, Jr. | 8/22/61 |
| 2,924,400 | Ruget | 2/09/60 |

U.S. Pat. No. 4,378,922 issued Apr. 5, 1983 to Pierce, which may be more pertinent to the present invention, discloses a system comprised of a plurality of essentially identical coplanar strakes which are not movable. This, however, contrasts with the present invention in which each associated foreplane and strake is of substantially different shape. The Pierce device operates by generating a plurality of weak vortices while the present invention serves to generate and control a single pair of strong vortices.

Still more pertinent, yet not anticipatory of the present invention, is U.S. Pat. No. 4,691,879 issued Sep. 8, 1987 to Greene which discloses an aircraft comprised of numerous airfoils including a delta nose wing, a winglet, a midspan wing, a V-tail delta wing, and an upper body stabilizer.

It was in light of the current technology as exemplified by the patents just described that the present invention was conceived and has now been reduced to practice.

SUMMARY OF THE INVENTION

The present invention, then, relates to high lift producing apparatus for an aircraft which includes a pair of foreplanes, one for each side of the aircraft, each foreplane extending between a root end at the fuselage and a distant tip end. Wings are mounted on the fuselage aft of the foreplanes and, intermediate the wings and the foreplanes, are a pair of strakes which are generally coplanar with their associated foreplanes and strakes, a leading edge of each strake being substantially coincident with a trailing edge of its associated foreplane, and a trailing edge of each strake being substantially coincident with a leading edge of its associated wing. The span of the strakes is smaller than the span of the foreplanes.

Each foreplane may be pivotally mounted on the fuselage at its root end on a stationary hinge axis which is substantially parallel with the longitudinal axis of the aircraft. The foreplanes are thereby movable between inactive positions, either flush with a contoured outer surface of the fuselage or totally within the fuselage, and deployed positions at which tip ends are distant from the fuselage. The foreplanes may also be pivotally mounted on lateral axes for control purposes. In one instance, the foreplanes can be simultaneously moved in the same direction about their associated lateral axes to achieve pitch control of the aircraft; in other instances, they can be simultaneously moved in opposite directions about their associated lateral axes to achieve either yaw control or roll control.

The foreplanes, in conjunction with their associated strakes generate control forces from airloads acting on the foreplanes and strakes themselves and from changes in airloads on adjacent fuselage surfaces induced by the control surfaces. For control surfaces located on an aircraft forward fuselage, as in the instant invention, the airloads can be used to generate pitching, yawing and rolling control moments, as previously noted.

Each foreplane may comprise a fuselage panel which normally forms part of the fuselage surface. The foreplanes may be deflectable into the airstream about a hingeline lying in the fuselage contour and in a plane substantially parallel to the longitudinal axis of the fuselage. In this configuration, the foreplanes normally lie flush in the fuselage's outer surface and are deployed only intermittently to generate a control impulse. In another configuration, they may pivot edgewise into and out of a cavity within the fuselage and their effectiveness would depend upon the extent of their movement into the slipstream of the aircraft. Deflection angles about their lateral or spanwise axes can range from zero to ninety degrees. A steady trim deflection would only be used under flight conditions where foreplane drag is of little consequence as when flying at high angles of attack.

The foreplanes may be of a variety of shapes, although the leading edges of the foreplanes are preferably generally of convex shape. Such a shape can be achieved by means of a plurality of intersecting straight edges or by a suitable continuous convex curve. Left and right foreplanes and their associated strakes are mirror images of each other with respect to an imaginary vertical plane passing through the fuselage centerline.

The strakes may be of constant span or may have a curved outboard edge, the span gently increasing with increasing distance aft along the fuselage. Additionally, the strakes may be in the nature of chines, that is, having an outer surface which is faired into the outer surface of the fuselage and terminating at a reasonably sharp outboard edge laterally distant from the main body of the fuselage. Such a construction aids in maintaining orderly flow along the boundary between the fuselage and the strake and increases the useful payload of the aircraft by enlarging its volume, additional fuel being a most likely commodity for the enlarged volume.

As a movable foreplane is deployed into the airstream, forces act on it as a result of its incidence relative to the airflow. The deflected foreplane also affects the body flowfield and thereby causes additional forces to act on the adjacent body surfaces. For certain aircraft configurations, the induced body forces may be detrimental.

The effectiveness of the combination of foreplanes and strakes will change with fuselage incidence relative to the free stream as the fuselage flow field changes from attached flow to separated flow. In addition to the locally generated control forces, it is necessary to consider downstream effects of the wake of the high lift combination. Certain restrictions on foreplane placement may be imposed for preventing the wake of the foreplanes and their associated strakes to be ingested by the engine air inlets or from adversely interfering with the empennage. Nonetheless, the invention serves to increase the maximum capability, and therefore maneuverability, of an aircraft and reduces minimum flight speed, a significant benefit being a higher turn rate.

Each foreplane generates a vortex and the strake amplifies the vortex and causes the vortex to flow across the upper surface of the wing thereby inducing greater lift from the wing. Therefore, the strake must be continuous from its leading edge to the wing so as to properly guide the vortex to the upper surface of the wing, without interruption. Deflection of the foreplanes allows the pilot or operator to control the strength of the vortices and thereby effect control of the aircraft. The result achieved by the combination of the foreplanes and strakes has been found to be greater than the sum of the incremental effects of either type of device used alone.

A primary object, therefore, of the invention is to provide apparatus for producing high lift characteristics for an aircraft comprising foreplanes with associated strakes wherein each strake is substantially coplanar with the foreplane and with the wing of the aircraft.

Another object of the invention is to provide such high lift apparatus in which a leading edge of the strake is substantially coincident with a trailing edge of the foreplane and a trailing edge of the strake is substantially coincident with the leading edge of the wing of the aircraft.

A further object of the invention is to provide such construction in which the foreplanes are retractable into the aircraft fuselage or flush with the outer surface of the fuselage but can be rapidly deployed, when required.

Another object of the invention is to provide foreplanes in combination with strakes which minimize drag and observability when not in use.

Still another object of the invention is to provide foreplanes in combination with strakes in which the foreplanes are selectively operable to provide pitch, yaw, and roll control, as desired.

Yet a further object of the invention is to provide such a high lift producing combination according to which foreplanes are pivotally mounted on axes which are substantially parallel to a longitudinal axis of the fuselage.

Yet another object of the invention is to provide such a foreplane and strake construction in which the foreplanes are deployed about a substantially vertical hinge enabling them to selectively retract fully within the body of the fuselage and just as readily extend fully into the slipstream of the aircraft.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate several of the embodiments of the invention, and, together with the description, serve to explain the principles of the invention in general terms. Like numerals refer to like parts throughout the disclosure.

DETAILED DESCRIPTION OF THE PREFERRED EMBODIMENTS

Figure 1:
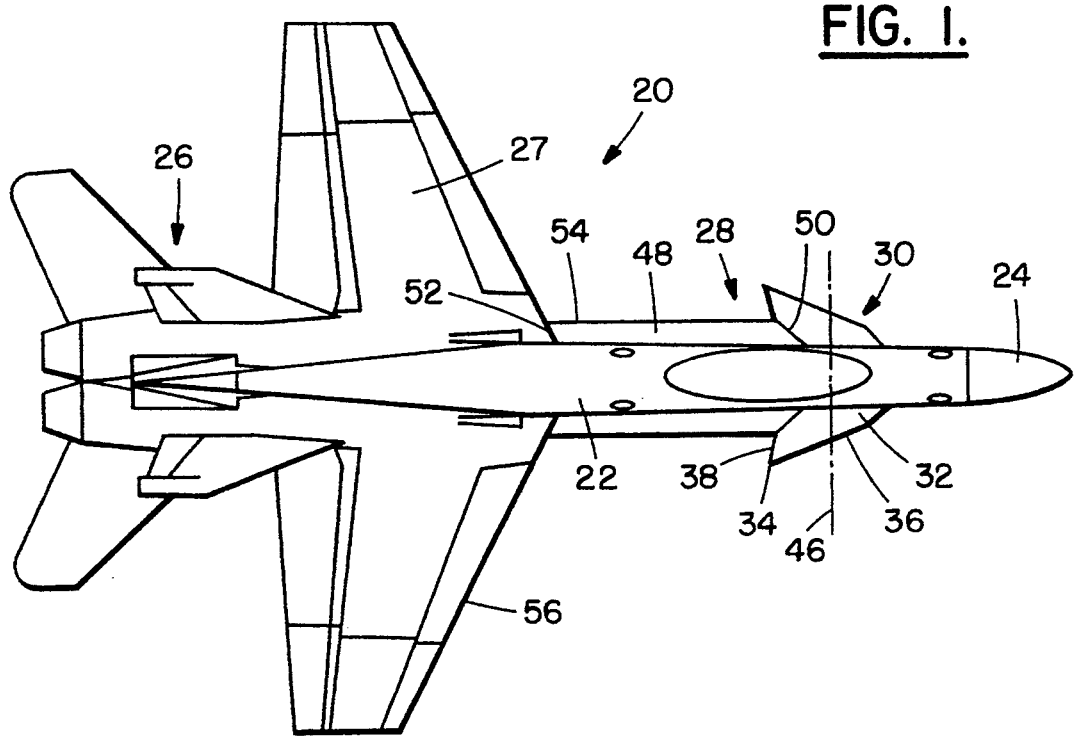
FIG. 1 is a top plan view of a high performance aircraft which embodies the present invention.
Figure 2:
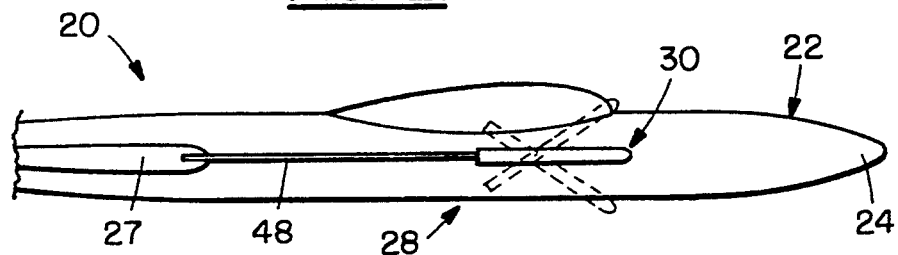
FIG. 2 is a side elevation view of a portion of the aircraft illustrated in FIG. 1 depicting a range of possible positions of a foreplane according to the invention.

Turn now to the drawings, and initially, to FIGS. 1 and 2 which generally depict an aircraft 20 which has been modified in accordance with the invention. Specifically, the aircraft 20 includes a fuselage 22 which extends between a nose 24 and a tail and/or afterbody 26, and wings 27. In accordance with the invention, the aircraft 20 is provided with unique aerodynamic apparatus 28 for producing high lift. The apparatus 28 includes a pair of foreplanes 30 mounted on opposite sides of the fuselage 22 and extending between a root end 32 and a tip end 34. Each foreplane 30 is also defined as extending between a leading edge 36 generally facing in a fore direction, that is, in the direction of the nose 24, and a trailing edge 38 generally facing in an aft direction, that is, in the direction of the tail 26.

Figure 3:
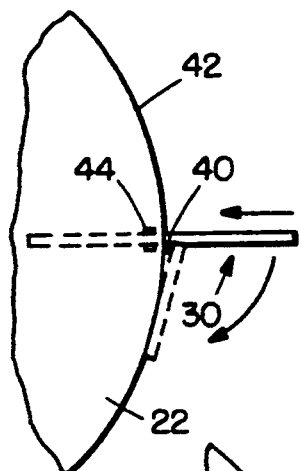
FIG. 3 is a detail front elevation view of the aircraft illustrated in FIGS. 1 and 2 and depicting possible movements of a foreplane according to the invention.

Each foreplane 30 may be, stationary. Alternatively, the foreplanes 30 may be movable, in a first sense between inactive and deployed positions and, in a second sense, through a range of deployed positions. As to the first sense, viewing FIG. 3, a suitable hinge 38, which may be in the manner of a single piano hinge, or in the manner of two or more offset hinges, serves to mount the root end 32 of each foreplane 30 for pivotal movement on the fuselage.

In this instance, the foreplane is movable between a fully deployed position, as indicated by solid lines, to a dashed line position substantially flush with a contoured outer surface 42 of the fuselage 22. In another instance of the first sense of movement of the foreplane 30, it may be pivotally mounted on a pin 44 for movement in its own plane from the fully deployed position indicated by solid lines to a dashed line position entirely within the fuselage 22.

As seen in FIG. 1, if movable in the second sense as discussed above, each foreplane 30 is pivotally movable about a control, or transverse, axis 46. The fuselage 22 has a contoured outer surface 42 as is customary for high performance supersonic aircraft. Also, each foreplane 30 has a streamwise cross section typical of an aerodynamic control surface. Each foreplane, as mentioned, is movable on its control axis 46 between a neutral position as indicated by solid lines in FIG. 2 and oppositely directed active positions as indicated by dashed lines in that figure. In the neutral position, the aerodynamic surfaces of each foreplane is substantially coplanar with an associated strake 48 and with an associated wing 27. In the deployed position, whether neutral or active, the tip end 34 is distant from the fuselage. It will be appreciated that the control surface 28 can assume any one of an infinite number of deflection angles between the neutral position and a fully active position.

Suitable actuators, not shown, are provided to enable the pilot of the aircraft 20 to desirably move the foreplanes between the inactive and deployed positions and to deflect the foreplanes when they are in the active position. By actuating a foreplane 30 on one side of the aircraft without actuating an associated control surface on the other side of the aircraft, yaw control is achieved. Actuating the foreplanes 30 on both sides of the fuselage equally and simultaneously provides pitch control of the aircraft. Combinations of these movements of the foreplanes 30 can be effectively used to provide more complex forms of control of the aircraft, as desired.

Figure 4B:
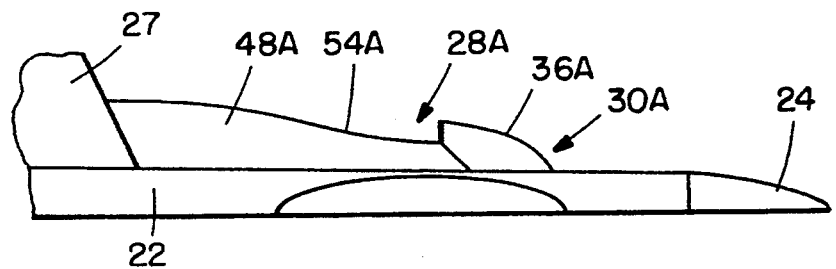
FIG. 4B is a detail top plan view of an aircraft, similar to FIG. 4A, and illustrating another embodiment of the invention.
Figure 4A:
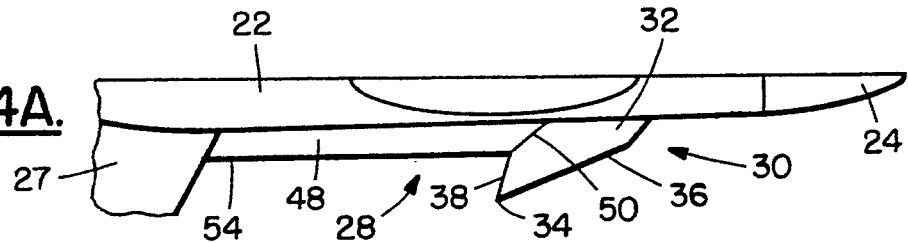
FIG. 4A is a detail top plan view of the aircraft illustrated in FIG. 1.

In FIGS. 1 and 4A, each foreplane 30 was described as having a leading edge 36 and that leading edge was depicted as being comprised of a pair of intersecting straight edges. It will be appreciated that the number of intersecting straight edges is not consequential from a patent standpoint. Indeed, it may be composed of one, two or many intersecting straight edges. However, in FIG. 4B, a modified foreplane 30A is depicted as having a leading edge 36A which is a continuous convex curve. Although not illustrated, it is also within the scope of the invention for a foreplane to be a combination of intersecting straight edges and one or more convex and/or concave curves.

Along with the foreplanes 30, the strakes 48 comprise an integral part of the present invention. Each strake 48 is mounted on the fuselage 22 in a manner generally coplanar with its associated foreplane and with its associated wing 27. The strake includes a leading edge 50, a trailing edge 52 and an outboard edge 54 distant from the fuselage. The leading edge 50 of the strake 48 is substantially coincident with the trailing edge 38 of the foreplane 30 and the trailing edge 52 of the strake is substantially coincident with a leading edge 56 of the wing 27. The strake 48 has a span which extends from the fuselage 22 to the outboard edge 54, the span being less than the span of the foreplane 30 at the location of intersection of the strake with the foreplane.

In flight, each foreplane 30 serves to generate a vortex. The associated strake 48 amplifies that vortex and causes it to flow across the upper surface of the wing thereby inducing greater lift from the wing. Accordingly, it is necessary that the strake be continuous from its leading edge to the wing so as to properly guide the vortex to the upper surface of the wing, without interruption.

In FIGS. 1 and 4A, the strakes 48 are depicted as having a substantially constant span fore and aft. However, in FIG. 4B, a modified strake 48A is illustrated which has an outboard edge 54A which is curved and has a span gently increasing with increasing distance aft along the fuselage 22.

Figure 5:
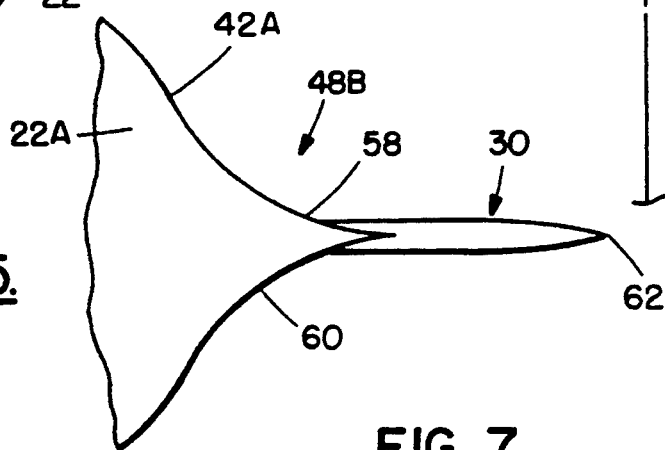
FIG. 5 is another detail front elevation view illustrating yet another embodiment of the invention.

In still another embodiment of the invention, in FIG. 5, a modified strake 48B is illustrated which is substantially in the form of a chine. That is, it has upper and lower surfaces 58, 60 respectively, which are faired into the outer surface 42A of a fuselage 22A. Additionally, the upper and lower surfaces 58, 60 merge in a fore and aft direction along an outboard edge 62 which is laterally spaced from the fuselage 22A. Such a construction serves to eliminate undesirable aerodynamic interference effects between the strake and the fuselage of the aircraft and, further, increases the useful payload of the aircraft by enlarging its volume. This enables the aircraft to carry a heavier payload of fuel, for example.

Figure 6:
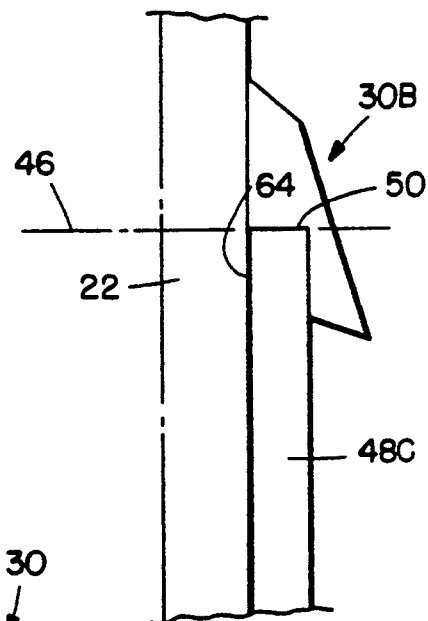
FIG. 6 is another detail top plan view illustrating still another embodiment of the invention.

Yet another embodiment of the invention is illustrated in FIG. 6. In this instance, a foreplane 30B has a cutout 64 in its trailing regions to receive leading regions of a strake 48C. The foreplane 30B is actually pivotally mounted, or hinged, on a leading edge 50C of the strake. In this manner, deflection of the foreplane 30B can be effected about the transverse axis 46.

Figure 7:
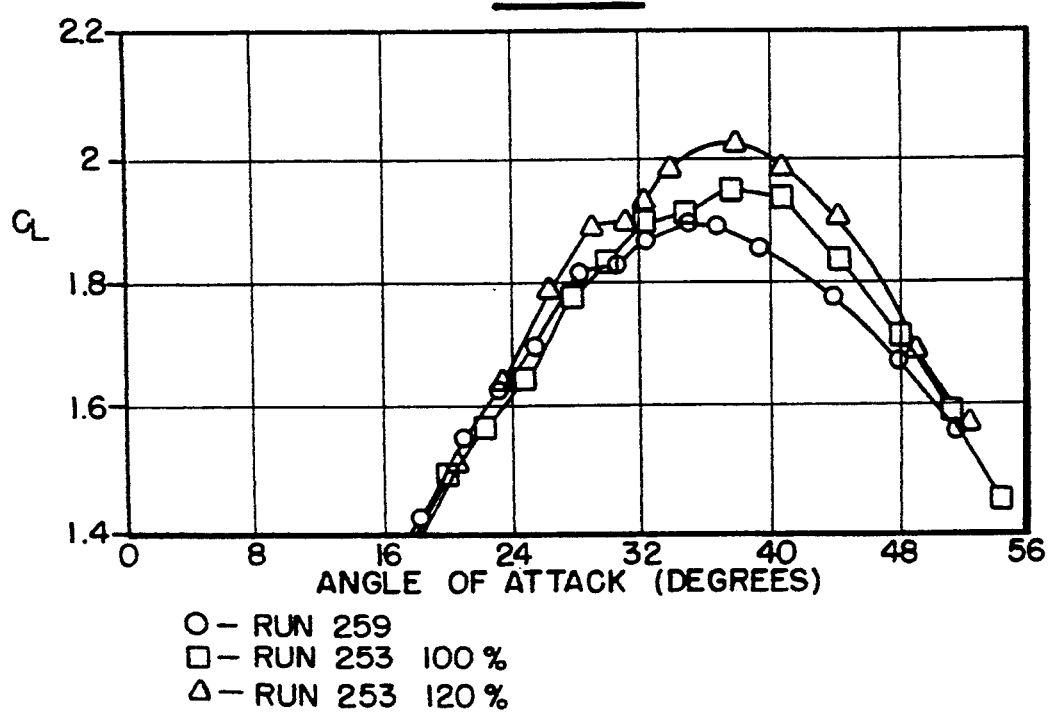
FIG. 7 is a graph presenting coefficient of lift as a function of angle of attack for a conventional aircraft and a pair of modifications thereto in accordance with the invention.

The improvement in performance provided by the invention is graphically illustrated in FIG. 7 which is a graph of the coefficient of lift versus angle of attack for, variously, a conventional aircraft utilizing a leading edge wing extension, an aircraft modified in accordance with the invention, and still another aircraft modified in accordance with the invention with a 20% larger foreplane surface area. It will be appreciated that at angles of attack between approximately 24° and approximately 50°, there is substantially greater lift imparted to the aircraft.

Accordingly, it can be said that benefits of the invention include the following:

maximum lift improvement per unit area is achieved
        up to 60% greater than that produced by a conventional aircraft provided with a leading edge wing extension.

the ability to produce large nose-down pitching moments and effect pitch-down recovery with little or no horizontal tail or elevator deflection being required.

high angle of attack lateral and/or directional control can be achieved by differential deflection of the foreplanes.

improved forebody and chine integration is achieved.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. In combination with an aircraft including a fuselage having a longitudinal axis and extending fore and aft, apparatus for producing high lift comprising:
   a foreplane mounted on said fuselage extending away from said fuselage in a deployed, position in a plane between a root end at said fuselage and a tip end distant therefrom and between a leading edge generally facing in the fore direction and a trailing edge generally facing in the aft direction, a distance perpendicular to the longitudinal axis of said fuselage between said root end and said tip end being a span of said foreplane;
   a wing mounted on said fuselage aft of said foreplane extending from said fuselage generally in said plane between a leading edge generally facing in the fore direction and a trailing edge generally facing in the aft direction said wing being generally coplanar with said foreplane in said deployed position; and
   a strake mounted on said fuselage between said foreplane and said wing, said strake extending from said fuselage generally in said plane, said strake being generally coplanar with said foreplane in said deployed position and with said wing, said strake including a leading edge, a trailing edge, and an outboard edge distant from said fuselage, said leading edge of said strake being substantially coincident with said trailing edge of said foreplane, said trailing edge of said strake being substantially coincident with said leading edge of said wing, said strake extending continuously from said leading edge of said strake to said wing, said strake having a span extending from said fuselage to said outboard edge, said span being a forward span at said leading edge of said strake which is less than said span of said foreplane.

2. The combination with an aircraft of high lift producing apparatus as set forth in claim 1 including:
   means mounting said foreplane on said fuselage for pivotal movement between an inactive position substantially received within said fuselage and said deployed position in said plane whereat said tip end is distant from said fuselage.

3. The combination with an aircraft of high lift producing apparatus as set forth in claim 1 including:
   means mounting said root end of said foreplane on said fuselage for pivotal movement on a stationary hinge axis which lies in a plane substantially parallel to said longitudinal axis.

4. The combination with an aircraft of high lift producing apparatus as set forth in claim 3
   wherein said fuselage has a contoured outer surface;
   wherein said foreplane has an aerodynamic surface extending between said leading edge and said trailing edge;
   said foreplane being movable on said hinge axis between an inactive position whereat said aerodynamic surface of said foreplane is substantially flush with said contoured outer surface of said fuselage and said deployed position in said plane whereat said tip end is distant from said fuselage.

5. The combination with an aircraft of high lift producing apparatus as set forth in claim 1
   wherein said foreplane is pivotally mounted on a laterally extending control axis transverse of the longitudinal axis of said fuselage.

6. The combination with an aircraft of high lift producing apparatus as set forth in claim 1
   wherein said foreplane is fixed to said leading edge of said strake.

7. The combination with an aircraft of high lift producing apparatus as set forth in claim 5
   wherein said control axis is substantially aligned with said leading edge of said strake.

8. The combination with an aircraft of high lift producing apparatus as set forth in claim 1
   wherein said strake has upper and lower surfaces, respectively, which are faired into said fuselage, said upper and lower surfaces merging in said fore and aft directions along said outboard edge of said strake distant from said fuselage.

9. The combination with an aircraft of high lift producing apparatus as set forth in claim 1
   wherein said span of said strake increases from said forward span with increasing distance in the aft direction from said leading edge of said strake.

10. The combination with an aircraft of high lift producing apparatus as set forth in claim 1
    wherein said foreplane is pivotally mounted on said leading edge of said strake.

11. The combination with an aircraft of high lift producing apparatus as set forth in claim 1
    wherein said span of said strake is substantially equal to said forward span with increasing distance in the aft direction from said leading edge of said strake.

12. In combination with an aircraft including a fuselage having first and second opposed contoured outer surfaces, having a longitudinal axis, and extending fore and aft, apparatus for producing high lift comprising:
    first and second laterally opposed foreplanes mounted on said fuselage extending from said first and second opposed contoured outer surfaces in first and second deployed positions in first and second planes, respectively, each of said foreplanes extending in said associated deployed position and plane between a root end at said fuselage and a tip end distant therefrom and between a leading edge generally facing in the fore direction and a trailing edge generally facing in the aft direction, a distance perpendicular to the longitudinal axis of said fuselage between said root end and said tip end of each said foreplane being a span of each said foreplane;
    first and second wings mounted on said fuselage aft of said foreplanes, said first and second wings extending away from said first and second opposed contoured outer surfaces, respectively generally in said first and second planes, respectively, said first and second wings being generally coplanar with said first and second foreplanes in said first and second deployed positions, respectively, each of said wings extending between a leading edge generally facing in the fore direction and a trailing edge generally facing in the aft direction; and first and second strakes mounted on said fuselage between said associated foreplanes and said associated wings, respectively, said strakes extending from said first and second opposed contoured outer surfaces, respectively, generally in said first and second planes, respectively, said first and second strakes being generally coplanar with said associated foreplanes in said associated deployed positions and with said associated wings, each said strake including a leading edge, a trailing edge, and an outboard edge distant from said fuselage, said leading edge of each said strake being substantially coincident with said trailing edge of said associated foreplane, said trailing edge of each said strake being substantially coincident with said leading edge of said associated wing, each said strake extending continuously between said leading edge of each said strake to said associated wing, each of said stakes having a span extending from said fuselage to said outboard edge, each said span being a forward span at said leading edge of said strake which is less than said span of said associated foreplane.

13. The combination with an aircraft of high lift producing apparatus as set forth in claim 12 including:

means mounting said foreplane on said fuselage for pivotal movement between an inactive position substantially received within said fuselage and a deployed position whereat said tip end is distant from said fuselage.

14. The combination with an aircraft of high lift producing apparatus as set forth in claim 12 including:

means mounting said root end of each of said foreplanes on said fuselage for pivotal movement on a stationary hinge axis which lies in a plane substantially parallel to the longitudinal axis of said fuselage.

15. The combination with an aircraft of high lift producing apparatus as set forth in claim 13 wherein said fuselage has a contoured outer surface;
wherein each said foreplane has an aerodynamic surface extending between said leading edge and said trailing edge;

each said foreplane being movable on said hinge axis between an inactive position whereat said aerodynamic surface of said foreplane is substantially flush with said contoured outer surface of said fuselage and a deployed position whereat said tip end is distant from said fuselage.

16. The combination with an aircraft of high lift producing apparatus as set forth in claim 12 wherein each said foreplane is pivotally mounted on a laterally extending control axis transverse of the longitudinal axis of said fuselage.

17. The combination with an aircraft of high lift producing apparatus as set forth in claim 12 wherein each said foreplane is fixed to said leading edge of said associated strake.

18. The combination with an aircraft of high lift producing apparatus as set forth in claim 16 wherein said control axis is substantially aligned with said leading edge of said associated strake.

19. The combination with an aircraft of high lift producing apparatus as set forth in claim 12 wherein said span of each said strake increases from said forward span with increasing distance in the aft direction from said leading edge of each said strake.

20. The combination with an aircraft of high lift producing apparatus as set forth in claim 12 wherein each said foreplane is pivotally mounted on said leading edge of said associated strake.

21. The combination with an aircraft of high lift producing apparatus as set forth in claim 11, wherein said first plane and said second plane are coplanar.

22. The combination with an aircraft of high lift producing apparatus as set forth in claim 11, wherein each said strake has upper and lower surfaces, respectively, which are faired into said associated opposed contoured outer surfaces of said fuselage, said upper and lower surfaces of each said strake merging in said fore and aft directions along said outboard edge of each said strake distant from said fuselage.

23. The combination with an aircraft of high lift producing apparatus as set forth in claim 11, wherein said span of each said strake is substantially equal to said forward span with increasing distance in the aft direction from said leading edge of each said strake.

* * * * *